United States Patent Office 2,875,128
Patented Feb. 24, 1959

2,875,128

PESTICIDE EMULSIONS CONTAINING AN OXY-ETHYLATED OXYPROPYLATED GLYCERINE

Willard H. Kirkpatrick, Sugar Land, and Virgil L. Seale, Houston, Tex., assignors to Visco Products Company, Houston, Tex., a corporation of Delaware No Drawing. Application December 7, 1953
Serial No. 396,771

8 Claims. (Cl. 167—43)

This invention relates to emulsions, especially oil-in-water emulsions, and more particularly emulsions containing at least four components, one of said components being water, the second of said components being oil, the third of said components being an emulsifying agent and the fourth of said components being an active essential ingredient employed for a specific purpose, for example, to kill pests, to destroy fungi or to destroy vegetation. If the fourth component is a toxic agent adapted to kill pests, the resultant composition is called a pesticide. If the fourth component is a toxic agent adapted to kill fungi, the resultant composition is called a fungicide, and if the fourth component is a toxic agent adapted to kill vegetation or to defoliate vegetation, the resultant composition is called a herbicide.

Many emulsions of oil-in-water which contains three components, namely oil, water and an emulsifying agent, are relatively unstable in the presence of a fourth component, such as those previously mentioned.

One of the objects of the present invention is to provide new and improved emulsions containing at least four components which are unusually stable.

Another object of the invention is to provide a new and improved method for preparing emulsions of the type described. Other objects will appear hereinafter.

In accordance with the invention these objects are accomplished by emulsifying oil, water and at least one other component, for example, a toxic agent, with an emulsifying agent which is an oxyethylated-oxypropylated glycerine wherein polyoxypropylene chains, preferably polyoxy-1,2-propylene chains, are attached to the glycerine nucleus, and polyoxyethylene chains are in turn attached to said polyoxypropylene chains, the terminal groups being hydroxyl groups of the polyoxyethylene chains.

The oxyethylated-oxypropylated glycerine preferred for the practice of the invention is preferably an oxyethylated-oxypropylated glycerine derived by oxypropylating glycerine with 60 to 70 parts by weight of 1,2-propylene oxide per part of glycerine, and then oxyethylating the oxypropylated glycerine with 0.5 to 0.7 part by weight of ethylene oxide per part of oxypropylated glycerine.

The oxyethylated-oxypropylated glycerine used in accordance with the invention is preferably a liquid having a viscosity greater than 30 centistokes at 100° F. It normally contains at least 120 mols of oxyalkylene groups per glyceryl group of which about 48 to about 66 mol percent, preferably 51% to 60%, is oxy-1,2-propylene and the remainder is oxyethylene. The kind and number of oxyalkylene groups should preferably be such that the resultant product is not a solid. Usually, no more than 126 oxy-1,2-propylene groups, nor more than 135 oxyethylene groups are reacted per molecult of glycerine.

The oxyethylated-oxypropylated glycerine employed in the practice of the invention is probably a trihydroxy polyoxyethylene-polyoxypropylene ether of glycerine containing an oxyethylated oxypropylene chain linked through an oxygen atom to each carbon atom of the glycerine molecule and having a terminal hydroxyl group at the end of each oxyethylene chain. The average number of oxypropylene groups (e. g., oxy-1,2-propylene) in each chain is preferably at least 27 and not more than 42, and the average number of oxyethylene groups in each chain is preferably at least 14 and not greater than 45. It will be understood, however, that the invention is not limited to any particular manner of defining the emulsifying agent. There seems to be little doubt that the preferred emulsifying agent is a complex mixture, although it might be possible to prepare individual components of the mixture which would be useful in the practice of the invention.

The invention is concerned with the preparation of emulsions containing at least four components and not the method of preparing the emulsifying agent, but for the sake of completeness, the following example is given to illustrate the preparation of oxyethylated-oxypropylated glycerine.

EXAMPLE I

One pound of glycerine and 60 grams of an alkaline catalyst such as NaOH or KOH was charged to a pressure nettle, with good agitation and proper temperature controlling facilities. This mixture was heated to 120° C. to 150° C. and then 1,2-propylene oxide added maintaining a temperature of 120° C. to 150° C. and pressure of 25 to 100 pounds per square inch gauge until 70 pounds of 1,2-propylene oxide per pound of glycerine was added. Samples were taken when 40, 50, 52½, 55 and 57½, 60, 62½, 65 and 70 pounds of 1,2-propylene oxide per pound of glycerine had been added. To each of the above sample 0.35, 0.44, 0.51, 0.57, 0.62 and 0.65 pounds of ethylene oxide per pound of oxypropylated glycerine base material were added. This gave a series of 54 samples for testing as emulsifiers. Each sample was neutralized with glacial acetic acid.

The reaction conditions, catalyst and proportions of the reacting components can be varied. For example, the temperature can be varied but is preferably within the range of 100° C. to 160° C. Other alkaline catalysts and varying proportions of catalyst can be used. Examples of other catalysts are sodium methylate, sodium ethylate and other alkali metal alcoholates. The proportion is usually small, e. g., 0.1 to 1.0 percent by weight of the total reactants. Catalyst can be added as the reaction proceeds. Nitrogen or other inert gas can be used to remove any air or free oxygen from the reaction vessel prior to the introduction of 1,2-propylene oxide or thereafter. The neutralization with glacial acetic acid neutralizes the catalyst and stops the reaction. Other acids such as lactic acid and homologous fatty acids can be used as neutralizing agents. Less than 0.1% water should preferably be present during the reaction.

The oxyethylated-oxypropylated glycerine compositions prepared as described in Example I were employed in the preparation of emulsions and tested as described in the following example.

EXAMPLE II

A concentrate having a specific gravity of 1.2 was prepared by dissolving 816 grams of technical Toxaphene in 462 grams of Varsol.

A second concentrate was prepared by dissolving 0.5 pound of DDT in 4 parts by volume of Solvesso 150 and 1 part by volume of xylene sufficient to make one quart of solution. 0.5 cc. of each compound to be tested as an emulsifier was added to 24.5 cc. of each concentrate to give a concentrate containing 2% by volume of the compound to be tested.

Emulsions were then prepared by adding one volume of each of the resultant concentrates containing the compound to be tested to 9 volumes of water in a graduated cylinder to give a total liquid volume of 250 milliliters. The cylinder was inverted twice to mix the liquids contained therein and the degree of spontaneous emulsification was noted. The resulting emulsion was then allowed to settle for 16 or 17 hours, after which the emulsion was evaluated for degree of emulsification and stability. The results were then rated and are shown by the following table.

*Table I*

| Base Material | | | .35 lb. EO/lb. Base | | .44 lb. EO/lb. Base | | .51 lb. EO/lb. Base | | .57 lb. EO/lb. Base | | .62 lb. EO/lb. Base | | .65 lb. EO/lb. Base | |
|---|---|---|---|---|---|---|---|---|---|---|---|---|---|---|
| Pounds PO Per Pound Glycerine | Percent OH | Vis. at 100° F. | A | B | A | B | A | B | A | B | A | B | A | B |
| 40 | 2.13 | 258 | NG | NG | NG | NG | NG | NG | NG | NG | NG | NG | NG | NG |
| 50 | 1.78 | 297 | | NG | | NG | F | NG | | NG | F+ | NG | G | NG |
| 52.5 | 1.73 | 306 | | NG | F− | NG | G− | F | | G− | G− | G− | G− | F+ |
| 55 | 1.62 | 353 | NG | NG | F | P | G− | G− | | G− | G− | F− | | P− |
| 57.5 | 1.58 | 395 | F− | NG | F | P | G | G | | G | G | F+ | | F |
| 60 | 1.70 | 328 | P | P+ | | G | F+ | G | G− | G | G | G | G | G |
| 62.5 | 1.61 | 320 | | NG | F− | G− | F+ | G++ | | | F | G++ | | G |
| 65 | 1.60 | 334 | F | G | F− | G | F− | G+ | | G | G− | G+ | G− | G+ |
| 70 | 1.52 | 356 | F+ | F+ | F | G++ | | | | | | | | |

PO = 1,2-propylene oxide.
EO = ethylene oxide.
A = Rating DDT.
B = Rating Toxaphene.
NG = No emulsification at all.
P = Shows very slight emulsification.
F = Some emulsification but definitely needs improvement.
G = Good.
Viscosity at 100° F. in centistokes.

The blocked out portion of the foregoing table illustrates the preparations in which emulsification was obtained. DDT and Toxaphene were chosen for these tests because they are very difficult to emulsify. Also, the Toxaphene concentrate has a specific gravity greater than that of water and therefore tends to settle to the bottom while the DDT concentrate has a specific gravity less than that of water and therefore tends to float on top of water. Thus, the tests not only illustrate the results obtained with an oxyethylated-oxypropylated glycerine containing varying proportions of oxypropylene and oxyethylene groups, but also illustrate the results obtained with two different types of insecticidal materials which are very difficult to emulsify and have different physical characteristics.

From the foregoing table, it will be seen that the oxyalkylated glycerine content of the successful emulsion-producing compounds have a propylene oxide content of at least 52.5 pounds of propylene oxide per pound of glycerine. Converting this value to mols of propylene oxide per mol glycerine, the oxyalkylated glycerine should contain at least about 83 mols of propylene oxide per mol of glycerine, and, as heretofore stated, the mols of propylene oxide per mol of glycerine do not exceed about 126. Again, in the foregoing table, at a content of 0.35 pound of ethylene oxide per pound of oxypropylated base, the weight ratio of propylene oxide to glycerine in the oxypropylated base should be at least 65 pounds of propylene oxide per pound of glycerine. At this propylene oxide content, and an addition of 0.35 pound of ethylene oxide per pound of oxypropylated base, the mol ratio of ethylene oxide per mol of glycerine is approximately 48. At an addition of 0.44 pound ethylene oxide per pound of oxypropylated base, the oxypropylated base should contain at least 55 pounds of propylene oxide per pound of glycerine. At these values, the oxyethylated oxypropylated product will contain approximately 52 mols of ethylene oxide per mol of glycerine. Accordingly, the minimum mols of ethylene oxide per mol of glycerine will be approximately 48 mols of ethylene oxide per mol of glycerine and preferably will be a minimum of about 52 mols of ethylene oxide per mol of glycerine. The maximum mols of ethylene oxide per mol of glycerine, as heretofore stated, will not exceed approximately 135.

EXAMPLE III

In order to compare the results obtained in the practice of the present invention with those obtained using various commercial emulsifying agents instead of the oxyethylated-oxypropylated glycerine, tests were carried out using the same procedure as described in Example II employing as the oxyethylated-oxypropylated glycerine the product obtained by first reacting one part by weight of glycerine with 65 to 70 parts by weight of 1,2-propylene oxide and then reacting each part by weight of the oxypropylated glycerine with 0.65 part by weight of ethylene oxide. The results are given in the following table in which the oxyethylated-oxypropylated glycerine is designated as "OEOPG."

The degree of emulsification was rated on a Nalco Phototester which measured turbidity, that is, light scattering due to colloidal dispersion. The higher the turbidity in microamperes, the smaller is the particle size and the greater is the degree of emulsification. Stability was measured in terms of the number of milliliters of settling in the 250 ml. graduate. The lower the amount of settling, the greater is the stability of the emulsion. The separation of oil from an emulsion is highly undesirable and when this occurred the amount of settling was not determined.

In the accompanying table, the spontaneous emulsion ratings and the turbidity readings (degree of colloidal dispersion or emulsification) are illustrated in column one or column two, respectively, under "Emulsification tests." Under this same caption there also appears a third or settling column in which is given for most emulsions the milliliters of material other than oil settling out upon standing quiescently for 16 to 17 hours. In this column the term "oil" is employed to denote oil separation. As shown by the tabulated data, the emulsion made with the oxyethylated-oxypropylated glycerine is superior to each and every one of the emulsions made with the well known commercial emulsifying agents Table II

| Insecticidal Concentrate | Emulsifying Agent | Emulsification Tests | | |
|---|---|---|---|---|
| | | Spontaneous Emulsification, Visual Rating | Turbidity, Microamperes | Settling, Milliliters |
| Aramite | OEOPG | good | 89 | 16 |
| Do | Atlox 1045-A | poor | 25 | 13 |
| Do | Atlox G-1256 | do | 15 | oil |
| Do | Emcol H-77 | do | 75 | oil |
| Do | Triton X-100 | do | 12 | 13 |
| Chlordane | OEOPG | good | 96 | |
| Do | Atlox 1045-A | poor | 11 | |
| Do | Atlox G-1256 | do | 15 | |
| Do | Emcol H-77 | fair | 50 | |
| Do | Triton X-100 | poor | 6 | |
| DDT | OEOPG | good | 94 | 14 |
| DDT | Atlox 1045-A | fair | 50 | 13 |
| DDT | Atlox G-1256 | poor | 40 | 13 |
| DDT | Emcol H-77 | fair | 60 | oil |
| DDT | Triton X-100 | poor | 25 | 14 |
| Dieldrin | OEOPG | fair-good | 94 | 18 |
| Do | Atlox 1045-A | fair | 25 | 13 |
| Do | Atlox G-1256 | do | 23 | oil |
| Do | Emcol H-77 | do | 65 | 16 |
| Do | Triton X-100 | poor | 5 | oil |
| Lindane | OEOPG | fair-good | 90 | 19 |
| Do | Atlox 1045-A | fair | 53 | 14 |
| Do | Atlox G-1256 | poor | 83 | 9 |
| Do | Emcol H-77 | fair | 81 | 15 |
| Do | Triton X-100 | poor | 40 | 14 |
| Toxaphene | OEOPG | good | 89 | |
| Do | Atlox 1045-A | fair | 15 | |
| Do | Atlox G-1256 | poor | 18 | |
| Do | Emcol H-77 | fair | 33 | |
| Do | Triton X-100 | poor | 12 | |

The commercial emulsifying agents employed in the foregoing tests are described below:

Atlox 1045–A is the mixed oleate laurate of polyoxyethylene sorbitol compounds recommended by the manufacturer as an especially suitable emulsifier for DDT-solvent concentrates and other similar toxicants.

Atlox G–1256 is a mixture of polyoxyethylenesorbitol esters of mixed fatty and resin acids.

Emcol H–77 is a blend of polyhydroxy alcohols incompletely esterified with fatty acids, especially dicarboxylic acids, particularly recommended by the manufacturer as an emulsifier for Chlordane emulsion concentrates of high Chlordane content.

Triton X–100 is a liquid, nonionic surface active agent especially suitable as an emulsifier for insecticides and herbicides and reported to be a polyoxyethylene glycol monoether of an octyl phenol.

The insecticidal concentrates used in the tests consist of the following formulations:

| Insecticide | Solvent | Insecticide Solvent Ratio |
|---|---|---|
| Aramite | Technical Xylene | 2 lb. Aramite per gal. solvent. |
| Chlordane | Varsol | 8 lb. Chlordane per gal. solvent. |
| DDT | 80 vol. percent Solvesso 150, 20 vol. percent Tech. Xylene | 2 lb. DDT per gal. of solvent. |
| Dieldrin | Technical Xylene | 1.5 lb. Dieldrin per gal. solvent. |
| Lindane | 50 wt. percent Xylene, 50 wt. percent Cyclohexanone | 25 wt. percent Lindane. |
| Toxaphene | Varsol | 6 lb. Toxaphene per gal. solvent. |

The various insecticides used to prepare the above described insecticidal concentrates are characterized as follows:

Aramite is an alkyl aryl sulfite useful as a miticide.

Chlordane ($C_{10}H_6Cl_8$) is a good insecticide for the control of grasshoppers.

DDT or 1,1,1-trichloro-2,2-bis(p-chlorophenyl)ethane is a valuable contact insecticide for the control of certain agriculture, household, and health pests.

Dieldrin is the epoxy derivative of Aldrin (a chlorinated naphthalene) and is an especially good insecticide for the control of cotton pests and grasshoppers.

Lindane is the gamma isomer of benzenehexachloride useful as a contact insecticide in the control of cotton pests, aphids, and wire-worms.

Toxaphene is a chlorinated camphene employed in the control of grasshoppers and most of the common cotton pests.

Of the solvents employed in the foregoing insecticidal concentrates, only two need special mention. Varsol is a straight petroleum solvent and Solvesso 150 is a high-content aromatic solvent synthesized from petroleum.

It will be recognized that in the foregoing tests the proportions are such that the resultant emulsions are oil-in-water emulsions. That is to say, the smaller component, namely the oil, forms the discontinuous phase and the larger component, namely the water, forms the continuous phase. In the practice of the invention, the active ingredient which forms the fourth component of the emulsion can be either in the oil or the water phase, depending upon whether it is soluble in oil or water or can be in both phases, if it is soluble in both phases. In most cases, however, where toxic agents are used as the fourth component of the emulsion they are soluble in organic hydrophobe solvents and substantially insoluble in hydrophillic solvents.

The preferred emulsifying agents are xylene soluble and also substantially soluble in water. The hydroxyl value (weight percent OH) as determined by acetylation (sometimes called the acetyl value) is preferably between 0.8 and 1.80.

The invention is especially advantageous in preparing relatively stable emulsions rapidly and is particularly valuable for the preparation of emulsions containing difficultly emulsifiable substances, including, for example, pesticidal, fungicidal and herbicidal emulsion compositions.

The invention is hereby claimed as follows:

1. An oil-in-water emulsion containing oil, water and at least one toxicant component selected from the group consisting of chlorinated camphene, 1,1,1-trichloro-2,2-bis(p-chlorophenyl)ethane, the gamma isomer of benzene hexachloride, Dieldrin, Chlordane and an alkyl aryl sulfite emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 48–135 mols of ethylene oxide per mol of glycerine.

2. An oil-in-water emulsion containing oil, water and at least one toxicant component selected from the group consisting of chlorinated camphene, 1,1,1-trichloro-2,2-bis(p-chlorophenyl)ethane, the gamma isomer of benzene hexachloride, Dieldrin, Chlordane and an alkyl aryl sulfite emulsified with an emulsifying agent which is an oxyethylated-oxypropylated glycerine derived by oxypropylating glycerine with 60 to 70 parts by weight of 1,2-propylene oxide per part of glycerine and then oxyethylating the oxypropylated glycerine with 0.5 to 0.7 part by weight of ethylene oxide per part of oxypropylated glycerine.

3. An oil-in-water emulsion containing oil, water and at least one toxicant component selected from the group consisting of chlorinated camphene, 1,1,1-trichloro-2,2-bis(p-chlorophenyl)ethane, the gamma isomer of benzene hexachloride, Dieldrin, Chlordane and an alkyl aryl sulfite emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxy groups of the polyoxyethylene chains, the oxypropylene groups forming 48% to 66% of the total oxyalkylene groups the oxyalkylated glycerine containing about 83–126 mols of propylene oxide per mol of glycerine and further containing about 52–135 mols of ethylene oxide per mol of glycerine.

4. An oil-in-water emulsion containing oil, water and chlorinated camphene emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 52–135 mols of ethylene oxide per mol of glycerine.

5. An oil-in-water emulsion containing oil, water and 1,1,1-trichloro-2,2-bis(p-chlorophenyl)ethane emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 52–135 mols of ethylene oxide per mol of glycerine.

6. An oil-in-water emulsion containing oil, water and the gamma isomer of benzenehexachloride emulsified with an emulsifying agent which is an oxyethylated-oxypropylated glycerine wherein polyoxypropylene chains are attachd to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 52–135 mols of ethylene oxide per mol of glycerine.

7. An oil-in-water emulsion containing oil, water and Dieldrin emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 52–135 mols of ethylene oxide per mol of glycerine.

8. An oil-in-water emulsion containing oil, water and Chlordane emulsified with an emulsifying agent which is an oxyethylated-oxypropylated glycerine wherein polyoxypropylene chains are attached to the glycerine nucleus and polyoxyethylene chains are in turn attached to said polyoxypropylene chains, the terminal groups being hydroxyl groups of the polyoxyethylene chains, the oxypropylene groups forming 48% to 66% of the total oxyalkylene groups, the oxyalkylated glycerine containing about 83–126 mols of propylene oxide per mol of glycerine and further containing about 52–135 mols of ethylene oxide per mol of glycerine.

References Cited in the file of this patent

UNITED STATES PATENTS

| | | |
|---|---|---|
| 2,447,475 | Kaberg et al. | Aug. 17, 1948 |
| 2,521,318 | Wohlers | Sept. 5, 1950 |
| 2,674,619 | Lunsted | Apr. 6, 1954 |

OTHER REFERENCES

Frear: "Pesticide Handbook," 4th ed., College Sci. Publs., State College, Pa., 1952, pp. 13, 14 and 134.

UNITED STATES PATENT OFFICE
CERTIFICATE OF CORRECTION

Patent No. 2,875,128                          February 24, 1959

Willard H. Kirkpatrick et al.

It is hereby certified that error appears in the printed specification of the above numbered patent requiring correction and that the said Letters Patent should read as corrected below.

Column 1, line 58, for "30 centistokes" read -- 300 centistokes --; line 60, for "glycerly" read -- glyceryl --; line 66, for "molecult" read -- molecule --; column 2, line 28, for "nettle" read -- kettle --; line 37, for "sample" read -- samples --.

Signed and sealed this 4th day of August 1959.

(SEAL)
Attest:

KARL H. AXLINE
Attesting Officer

ROBERT C. WATSON
Commissioner of Patents